Patented June 2, 1931

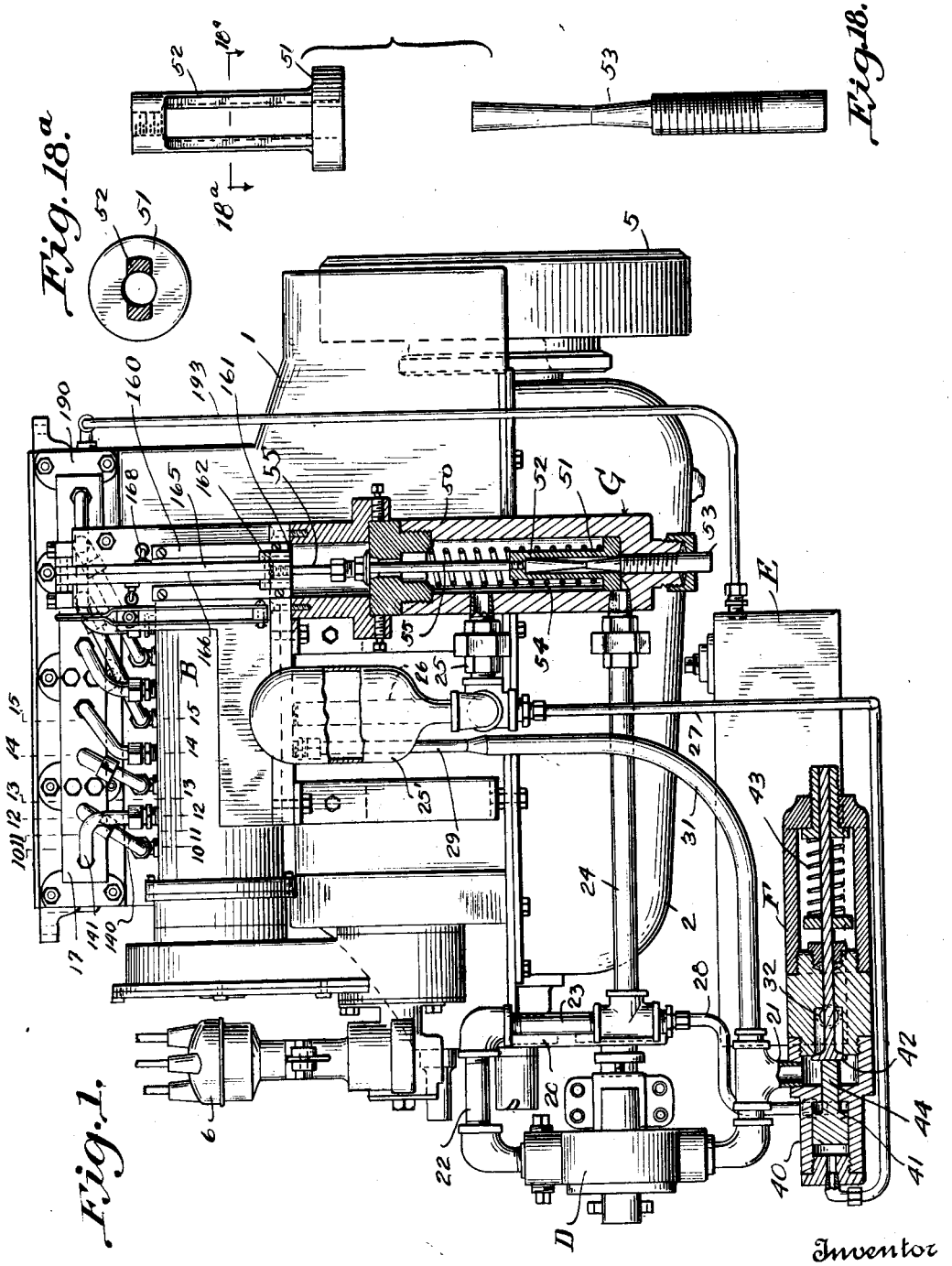

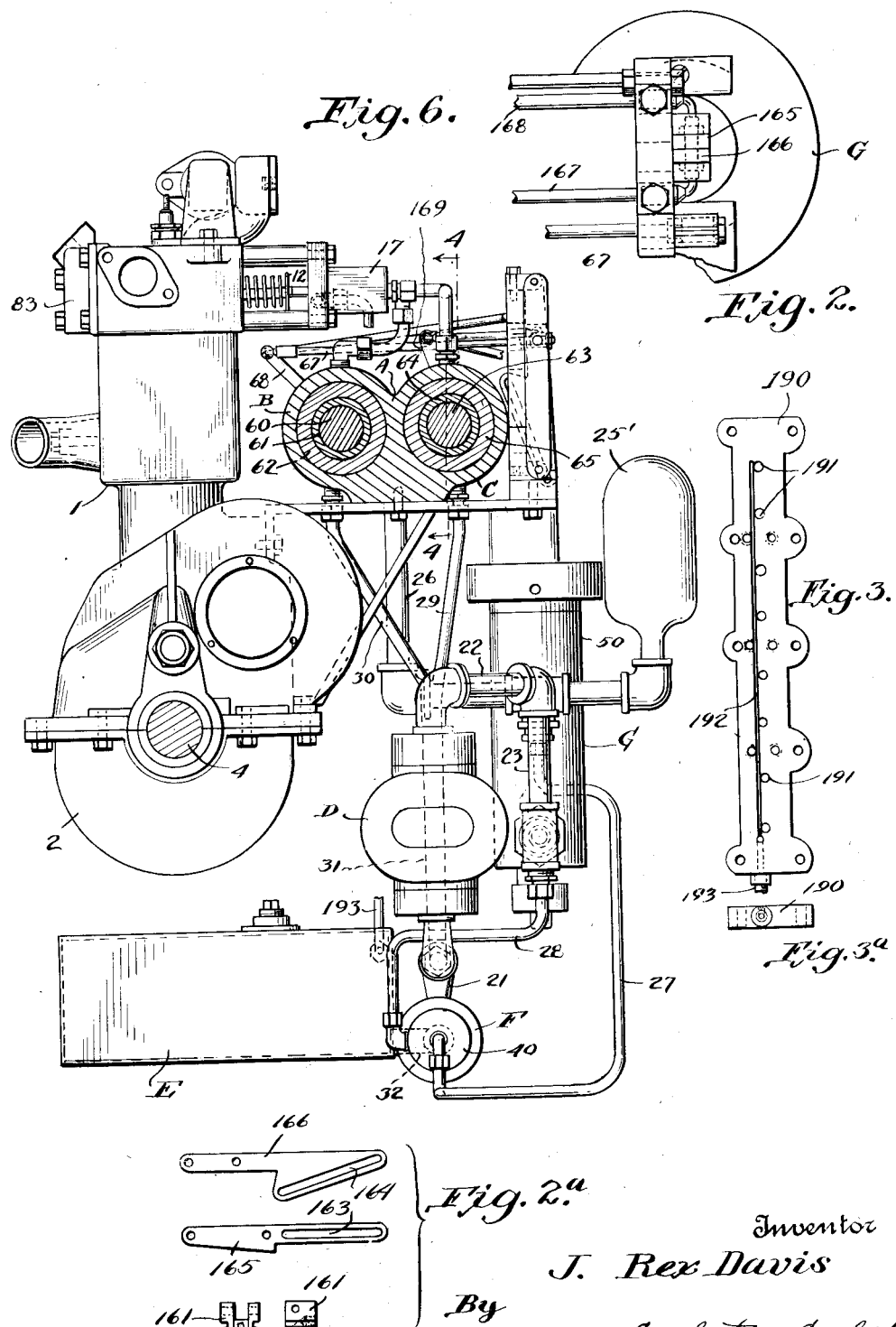

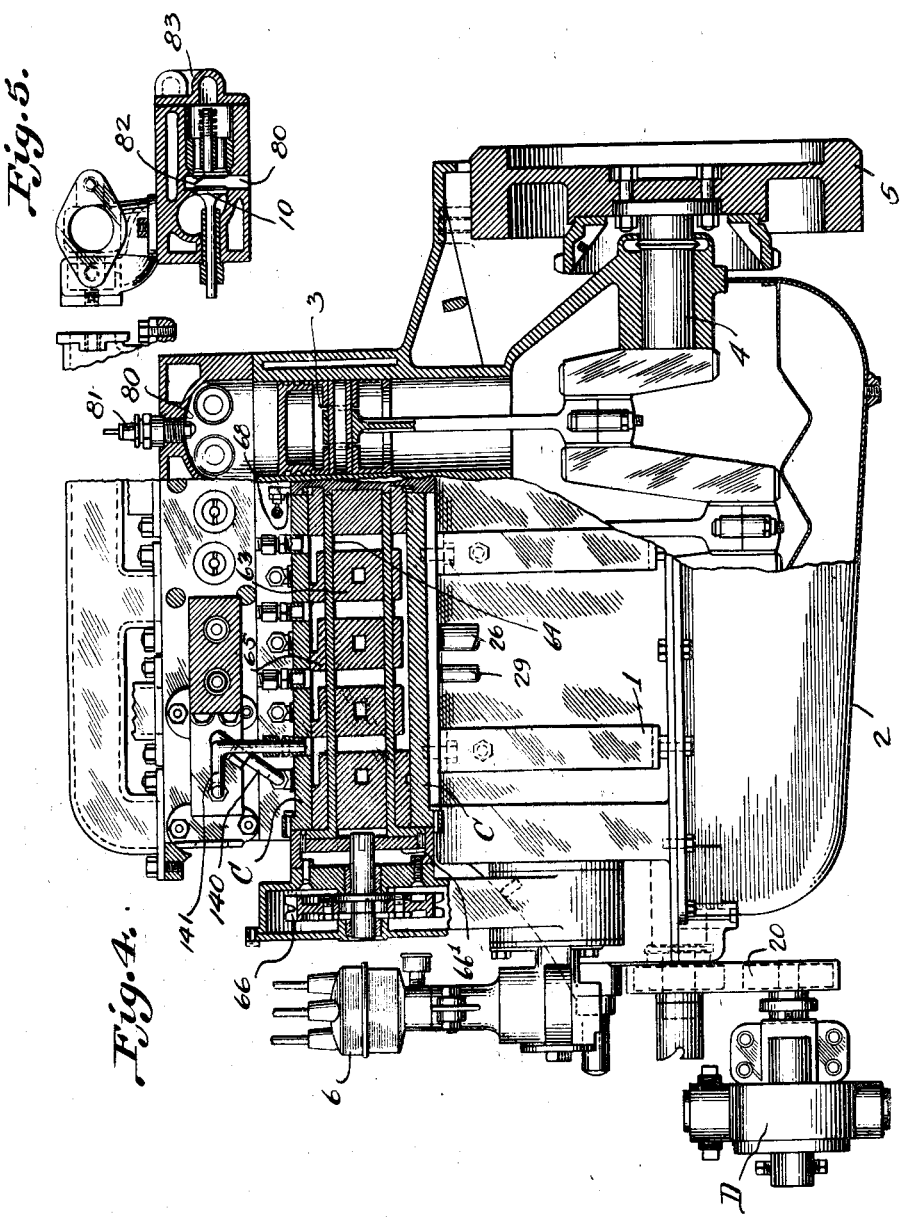

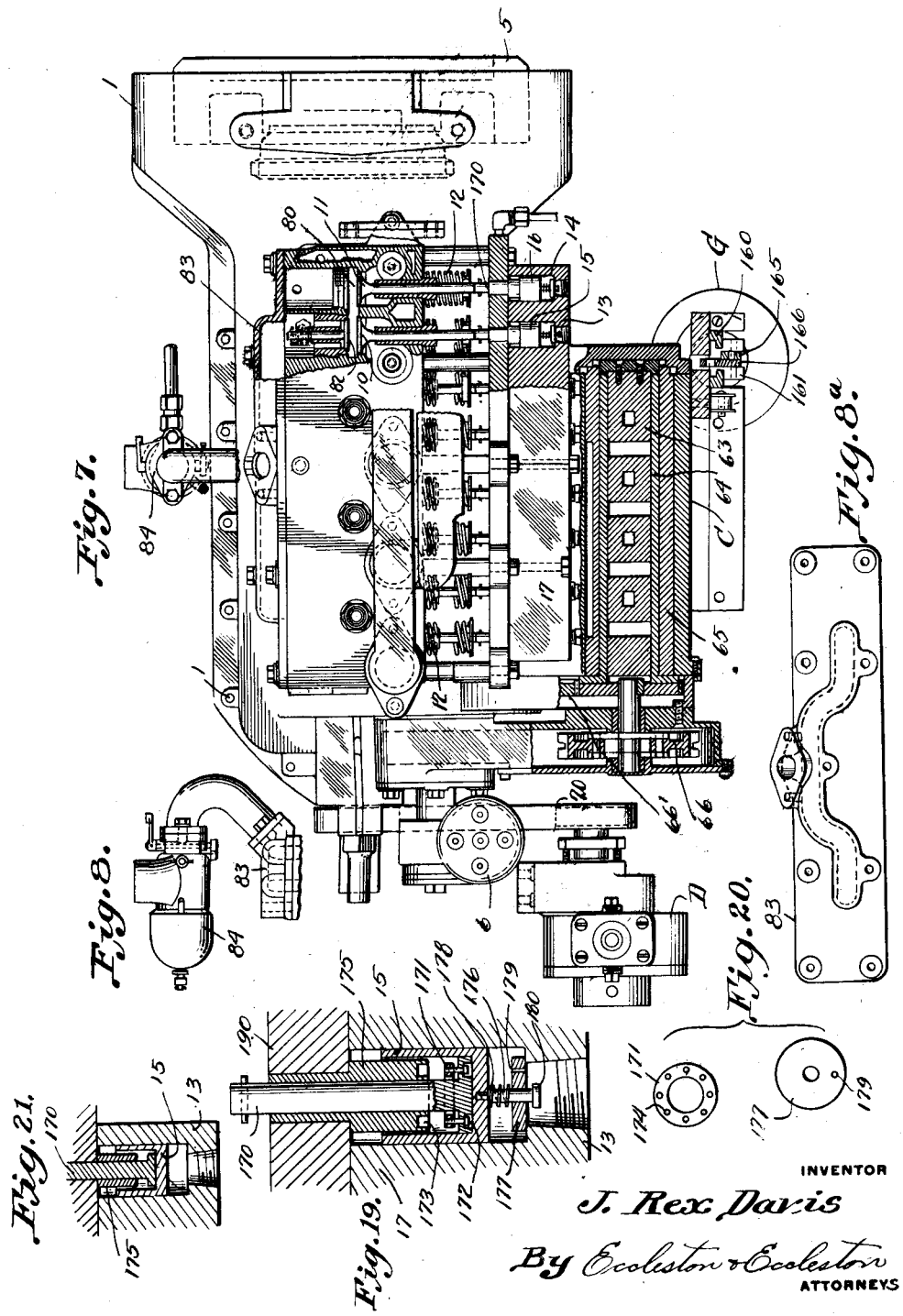

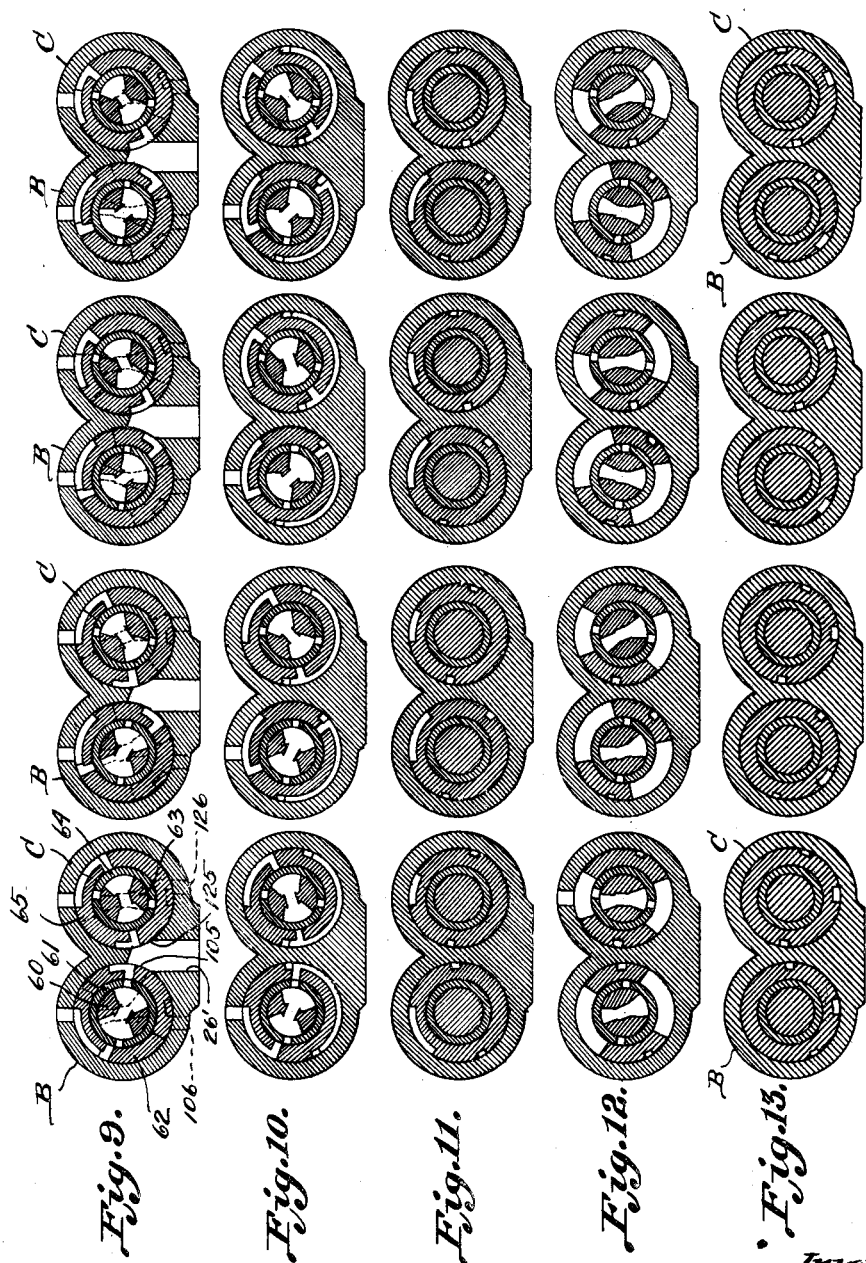

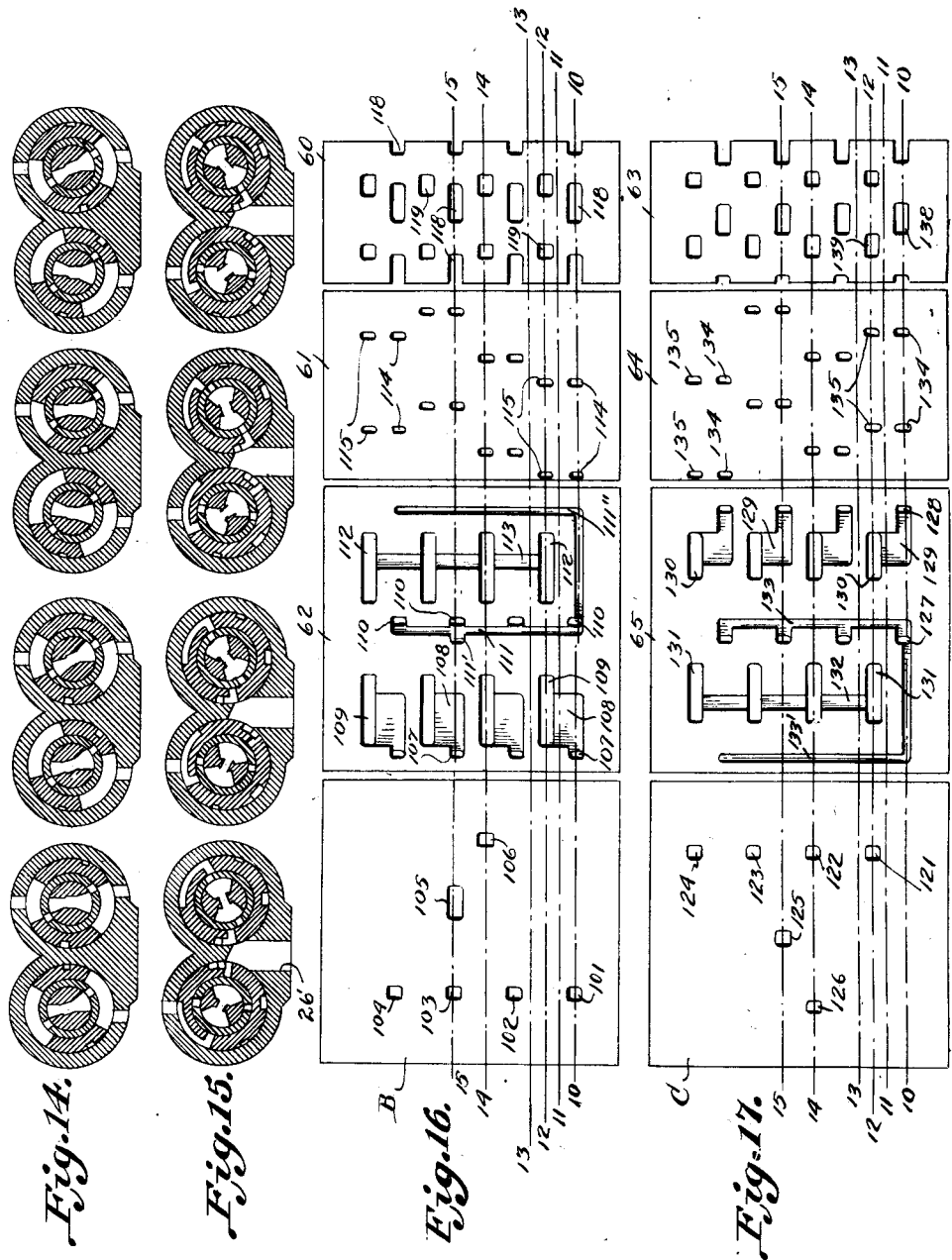

1,807,832

UNITED STATES PATENT OFFICE

JOSEPH REX DAVIS, OF CLARKSBURG, WEST VIRGINIA

INTERNAL COMBUSTION ENGINE

Application filed February 28, 1927. Serial No. 171,689.

This invention relates primarily to internal combustion engines and has for its objects the general improvement of such engines in both efficiency and operation, and also to improve the operation of all machines in which it is necessary or desirable to change the relative time of operation of various parts.

It is well understood that the efficiency of the present type of internal combustion engines varies greatly under the differing speed and load conditions usually encountered during their operation, and especially is this true with the engines used for automotive purposes. This change in efficiency is due to many causes and it is deemed advisable to mention briefly a few of such causes of inefficiency in order to more clearly set forth the objects and advantages of the present invention.

First. One of the principal difficulties of, and objections to all prior types of variable speed internal combustion engines, has been the necessity of limiting the quantity of gases entering the cylinder to an amount just sufficient to obtain the desired power and speed. This method of regulation is conducive to several causes of inefficiency of which the following are some of the principal ones.

(a) When the gases are restricted or throttled so as to prevent the entrance of a sufficient quantity to completely fill the cylinder to atmospheric pressure, there will be a partial vacuum existing within the cylinder at the completion of the suction stroke, which absorbs power for its production. And again, when a partial vacuum exists within the cylinder at completion of the suction stroke, the pressure obtained at the completion of the compression stroke will not be as great as it would be had the partial vacuum not existed, and as the efficiency of all internal combustion engines is dependent upon the degree of compression at the time of ignition, the reduction of the compression pressure causes a like reduction in efficiency.

(b) When the normal quantity of gases are prevented from entering the cylinder a suction is produced which tends to draw more or less of the lubricating oil from around the piston into the combustion chamber. This oil not only prevents as rapid combustion of the explosive gases, with an attendant reduction of the maximum temperature obtained, but also causes a heat absorbing layer or carbon to be deposited upon the surfaces of the combustion chamber, which further reduces the efficiency of the engine.

(c) When the quantity of explosive gases entering the cylinder is restricted or throttled, as in previous types of engines, to less than the normal capacity of the cylinder, a condition is produced which tends to cause a less homogeneous mixture of fuel and air entering the cylinder thereby reducing the effective pressures obtained during combustion. This condition is due primarily to the fact that the admission valves are open the same relative time irrespective of the quantity of gases allowed to pass through them, thus requiring that a change of velocity of the gases occur for each change of quantity entering the cylinders.

Second. Another objection to previously constructed engines is that the valves could be made to open and close at only one predetermined position relative to the piston position, and as each speed requires that the valves operate at some different position from that of any other speed, it has been necessary to compromise on some position for the valve operation which seemed to give the best efficiency throughout the range of speed at which the engines were intended to operate. This is not necessary in the present invention as the valve operating position may be changed with each change of speed so as to correspond with the correct position for each speed.

Third. The efficiency of an internal combustion engine is dependent to a very large extent, upon the shape of the combustion chamber, yet more or less of a departure from the ideal shape has been necessary in order to align the valves with the rotative parts of the engine. In the present invention all restrictions of this nature are removed as it is not necessary that the valves be placed in any particular position.

Fourth. In previous engines it has been necessary to maintain a very correct adjustment between the valves and valve operating mechanism, in order to have the valves operate uniformly and quietly, especially is this true in multiple cylinder engines. In the present invention all adjustments between valves and valve operating mechanism are eliminated because the valve itself determines the amount of movement of the operating mechanism, and also no space is necessary between the parts to compensate for expansion.

The foregoing are a few of the many disadvantages which contribute to the inefficiency of the present day motor, and the invention hereinafter described has been devised primarily to overcome these objectionable features.

An object of the invention consists in the provision of a novel type of time and phase changing mechanism for obtaining and maintaining the correct relationship of the valves with the piston positions and yet which in its broader aspect is adapted to change the time and phase of any type of mechanism with which it may be associated.

Another object of this invention resides in the provision of a novel type of engine in which periods of the admission valve closing and the exhaust valve opening and closing, may be maintained in the most advantageous relationship to the piston positions at all speeds.

Another object of the invention consists in the provision of means whereby a nearly constant compression pressure is maintained at the time of ignition.

A further object of the invention is to secure a more nearly uniform mixture of fuel and air at all speeds.

Another object of the invention resides in so constructing an engine as to facilitate the use of a heavy or low grade fuel for supplying a part of the power developed by the engine.

An additional object of the invention consists in the provision of means for procuring a quicker opening of the valves and for maintaining the valves wide open a longer period particularly at slow speeds than is practical in the present type of internal combustion engines now in use.

Another object of the invention consists in the construction of a valve-operating mechanism which is so designed as to permit the intake and exhaust valves to be located at the most advantageous positions with respect to the combustion chamber.

Other objects and advantages of the invention will be apparent from the following description when taken in connection with the accompanying drawings, in which:

Figure 1 is a side elevation of the engine, parts being shown in section, and parts being broken away to more clearly show the construction.

Figure 2 is a fragmentary plan view of the connections between the sleeves for controlling the flow of operating fluid to the valve operating cylinders and the piston for operating the sleeves.

Figure 2$^a$ is a detail view of certain of the parts shown in Figure 2.

Figure 3 is a plan view of the base for the valve operating cylinders.

Figure 3$^a$ is an end view of the base shown in Figure 3.

Figure 4 is a side elevation of the engine, with a vertical section on line 4—4 of Figure 6, and other parts being broken away to more clearly disclose the construction.

Figure 5 is a vertical section through the engine head showing one of the admission valves and the auxiliary valve controlled thereby.

Figure 6 is an end view of the engine with parts cut away to more clearly show the connections between different parts of the fluid system.

Figure 7 is a plan view of the motor partly in section.

Figure 8 is a detail end view of auxiliary valve manifold to which it attached a supplemental carburetor of conventional type which may be employed in the present construction.

Figure 8$^a$ is a detail side view of auxiliary valve manifold showing passages leading to the auxiliary valve.

Figure 9 shows a plurality of sections through the valve controlling sleeves and showing the same in the four extreme positions. The clear passages indicating the course of fluid to the valve-operating cylinders and the dotted passages indicating the course of fluid away from the valve-operating cylinders.

Figures 10 to 15 inclusive are sections through the time controlling sleeves taken on lines 10—10, 11—11, 12—12, 13—13, 14—14, and 15—15 respectively of Figure 1.

Figure 16 is a diagrammatic view of the several sleeves (flattened out) controlling the admission valves.

Figure 17 is a diagrammatic view of the several sleeves (flattened out) controlling the exhaust valves.

Figure 18 is a detail view of metering pin and control piston.

Figure 18$^a$ is a section taken on line 18$^a$—18$^a$ of Figure 18.

Figure 19 is an enlarged section through one of the valve operating cylinders.

Figure 20 is a detail view of certain elements for controlling the speed of the valves at the point of seating and at the limit of its opening movement, and Figure 21 is a section through a modified form of valve operating cylinder.

Referring to the drawings in greater detail the numeral 1 designates the internal combustion engine, which is provided with the usual crank case 2, pistons 3, crankshaft 4, flywheel 5, and ignition distributor 6; and while a four cylinder engine is depicted in the drawings it will be obvious that the invention hereinafter described is equally well adapted to an internal combustion engine having any desired number of cylinders.

I will now describe in a general way the several elements of the present invention which combine to produce the advantageous results hereinbefore stated briefly as objects of the invention.

The letter A indicates a timing or fluid distributing device for operating the admission and exhaust valves 10 and 11 respectively of each cylinder of the engine (Fig. 7). This timing device comprises two sets of sleeves B and C which will be described in detail hereinafter; the set B operating in conjunction with the admission valves and the set C with the exhaust valves. It will be understood that while the outer sleeves are shown as integrally connected and forming a double casing they may nevertheless be formed separately if so desired.

A pump D serves to provide the fluid pressure employed in the valve operating system and takes its supply of fluid from a tank E. In this connection it may be stated that the present invention contemplates the use of oil as the operating medium for the cylinder valves, although it is apparent that other fluids might be equally well adapted to the purpose. It being only essential that a medium be employed which is responsive to, or which at least readily adjusts itself to, the changing conditions developed in the engine.

The letter F designates generally a pressure regulator installed in the fluid pressure system and which functions to control the amount of fluid supplied to the pump D, thereby preventing an excessive pressure in the system, this being essential for the reason that the capacity of the pump is necessarily greater than the capacity of valve operating cylinders hereinafter described.

Also forming a part of the valve operating system is a cylinder and metering device referred to generally by the letter G. This part of the system is directly connected with the timing mechanism A and its operation is, through the medium of the fluid in the system, responsive to the speed of the engine to thereby cause the necessary adjustments within the timing mechanism so as to vary the time of closing of the admission valve and the time of opening and closing of the exhaust valve. This metering device G forms a complementary part of the pressure regulator F in that it is so constructed as to build up differential pressures which when transmitted to the pressure regulator adjust the latter to conform to the varying conditions of operation.

The admission and exhaust valves 10 and 11 are normally moved to closed position by springs 12, but are controlled in both their opening and closing movements by fluid pressure operated cylinders 13 and 14 in which are located the valve rods which are provided with pistons 15 and 16 respectively. The valve operating cylinders are formed within a housing 17.

I will now describe in detail the pump D and its several connections.

The pump is of a conventional type of rotary fluid pressure pump, and as will be observed from an inspection of Figure 4 is geared to the crank shaft 4 by gearing 20 so as to operate at crankshaft speed. The suction side of the pump is connected to the pressure regulator F by pipe 21, and the pressure side of the pump is connected at the base of cylinder G by piping 22, 23 and 24, from whence the fluid is conducted through pipe 25 to the casing of the timing device, and through pipe 27 to one end of the cylinder forming a part of the pressure regulator hereinafter described. An air chamber 25' is connected to this part of the system to render the flow of the fluid uniform. Also connected to pipe 24 is a pipe 28 which leads to the opposite end of the cylinder of the pressure regulator. The operating fluid after performing its functions in the valve operating cylinders is returned to the suction side of the pump D by the pipes 29, 30 and 31, from whence it is again circulated through the pressure system.

The pump D has a greater capacity in a given number of revolutions than the sum of the capacities of the valve operating cylinders operated in the same number of revolutions, therefore any desired pressure may be maintained for operating the valves. Accordingly, it is of importance that some means such as regulator F be employed to maintain the pressure at the desired values; these values depending upon the speed of the engine. In order that the pressure may be increased with a definite relationship to the speed of the engine, advantage is taken of the differential pressure existing in pipes 24 and 27; this differential pressure being created by the cylinder and piston G in a manner to be later described.

I will now describe the pressure regulator F by means of which a sufficient quantity of operating fluid is allowed to pass to the pump, to maintain the correct fluid pressure at all speeds of the engine.

The regulator consists essentially of a cylinder 40, piston 41, and a valve 42 which is biased in one direction; i. e., to open position by a spring 43. The closing of the valve is controlled entirely by the piston 41, by means of piston rod 44. As hereinbefore stated, the cylinder has its opposite ends connected to two different parts of the system by the pipes 28 and 27, and the two different pressures in these pipes act on the two sides of the piston 41. It will be noted from an inspection of Figure 1 that the areas of the opposite sides of this piston are different, the greater area being at the left side (Fig. 1) of the piston, and the ratio of these areas is such as to obtain a definite action commensurate with changing conditions of engine operation dependent upon the pressures in the two pipes. The spring 43 is so adjusted in conjunction with the force acting on piston 41 caused by the pressure in pipe 28, that valve 42 will remain open until the pressure in pipe 25 reaches a desired value, at which time valve 42 will be closed by the force exerted on the opposite side of piston 41 caused by pressure in pipe 27. This condition will continue so long as there is no change in speed; however, should the speed be increased, a momentary reduction of pressure will take place in pipe 25, due to more fluid being allowed to pass through the distributor, also there will be an increase of pressure in pipe 24 due to the increased speed of pump D. The effect of these changes in pressure on piston 41 is such as to allow spring 43 to open valve 42, thereby allowing an additional amount of fluid to pass to the suction side of pump D. The quantity of additional fluid being controlled by the ratio of the areas on the two sides of piston 41 in conjunction with the resistance offered to the passage of the increased volume through cylinder and piston G.

I will now describe the functions of the metering device G to which reference has been heretofore had in a general way.

The cylinder which is designated by numeral 50 is provided with a piston 51 which is provided with the upwardly extending arms 52 integrally connected at their upper ends. Extending upwardly through the base of the cylinder 50 is a metering pin 53 which is threaded to the base of the cylinder and extends upwardly through the piston 51 and between the arms 52. A coil spring 54 surrounds the arms 52 and is seated at its lower end against the upper side of the piston 51. The upper end of spring 54 is seated against the top wall of cylinder 50. The metering pin 53 is so shaped as to regulate the proper height to which piston 51 will be raised by the quantity of oil necessary for operating the valves at each particular speed. To the upper ends of the arms 52 is attached a rod 55 which extends through the upper end of the cylinder 50 and has its other end attached to operating means for the sleeves of the distributing valves to be later described.

As the engine is started and the pump D causes a circulation of the operating fluid through the system it will be apparent that this fluid must pass through the hole in piston 51, around metering pin 53, thence outwardly between the arms 52 to the pipe 25. As the engine speeds up, however, it is obvious that an increasingly larger volume of oil will pass through pipe 24 in a given period of time and in doing so will raise the piston 51 against the pressure of its spring 54 an amount sufficient to allow this volume of oil to pass. Therefore, as the volume of oil passing through cylinder 50 increases directly with the speed of the engine, the differential pressures between pipes 24 and 27 will also increase and cause a change of forces acting on piston 41 which allows valve 42 to open until sufficient fluid is drawn into the circulating system from the tank E through pipe 32 to increase the pressure the correct amount for that speed, at which time the pressure in pipe 27 will cause the valve 42 to close due to the difference in area of the two sides of piston 41. The air chamber 25' serves the purpose of maintaining a more uniform pressure on the fluid while passing through the timing mechanism into the valve operating cylinders. Furthermore, this increased pressure produced by the speeding up of the pump D is for the purpose of obtaining a quicker opening of the valves at high speeds. As just described the movement of the piston 51 serves to vary the opening between the metering pin and the hole in the piston 51 according to the volume of fluid passing per second. The piston 51 also performs the function of regulating the positions of the controlling sleeves of the timing or fluid distributing device, for the valve operating cylinders, by its movements being transmitted through the rod 55 to operating mechanisms to be later described; and I will now proceed with the description of the timing or fluid distributing device.

The timing device which is designated generally by letter A comprises two sets of sleeves mounted within two casings and indicated generally by the letters B and C. Part B serving to control the admission valves which are four in number in the present embodiment of the invention, and the part C controlling an equal number of exhaust valves. These sleeves and the casings therefore are shown in detail in Figures 9 to 17 inclusive.

Within the casing B are three sleeves 60, 61 and 62, while within the casing C are three similar sleeves 63, 64 and 65. The sleeves 61 and 64 are mounted for rotation as clearly shown in Figures 4 and 7 and are geared to the engine crankshaft 4 as indicated by gear wheels 66 and 66' so as to rotate in opposite directions at one-fourth crankshaft speed. Within the respective sleeves 61 and 64 are sleeves 60 and 63 which are circumferentially adjustable, and between the sleeves 61 and 64 and their respective casings B and C are sleeves 62 and 65, also mounted for circumferential adjustment. These sleeves are all provided with openings or ports for the passage of oil to and from the valve operating cylinders and will be indicated specifically by reference numerals below.

Before entering into a detailed description of this timing mechanism I will give a brief outline of the action of the explosive and exhaust gases in the ordinary types of internal combustion engines, and compare such action with the action possible where the valves are relatively adjustable as in the present construction.

In prior types of internal combustion engines it is necessary to select in advance some speed at which it is desired to obtain the highest efficiency and so time the valves relative to the crankshaft as to allow the maximum volume of explosive mixture to be drawn into the cylinder during the suction stroke and the burned gases expelled as completely as possible at this particular speed. At relatively high speeds this is accomplished by allowing the admission valve to remain open for a length of time after the piston has completed the suction stroke, so as to take advantage of the momentum of the gases in more completely filling the cylinder. The exhaust valve is opened before the completion of the expansion stroke in order to eliminate as nearly as possible any back pressure which would be present if the valve was not opened until the stroke was completed. This early opening of the exhaust valve also allows a more complete discharge of the burned gases. These positions are fixed in the ordinary engines irrespective of varying speeds. In four cycle engines the ideal condition, however, at low engine speed is to cause the admission valves to open at the beginning of the suction stroke, close at the finish of the suction stroke, and the exhaust valves to open at the end of the expansion stroke and close at the finish of the scavaging stroke. This ideal condition would hold true however, only at slow speed for the reason that a certain amount of time is required for the gases to start entering the cylinder after the piston begins its suction stroke, and this can be partly compensated for by allowing the admission valve to remain open a varying amount of time after the suction stroke is completed, dependent upon the engine speed. In this way advantage is taken of the momentum acquired by the gases in the manifold during the suction stroke which tends to cause them to continue entering the cylinder after the suction stroke is completed. As the speed of the engine increases it is necessary to allow the admission valve to remain open an increasing length of time after completion of the suction stroke in order to take full advantage of this condition.

An entirely different set of conditions exists with respect to the exhaust valve in order to eliminate the burned gases and prevent dilution of the explosive mixture. It is necessary to open the exhaust valve at an earlier relative position to the crankshaft at the higher speeds, as the hot gases are not in contact with the cylinder walls for so long a time, therefore, the dissipation of heat is not so great, thus causing the gases to have a higher temperature and consequently a greater volume at the beginning of the exhaust stroke. This increased volume would cause a back pressure to be exerted on the piston unless the valve was opened at an earlier point in the cycle of operation so as to allow sufficient time for the increase in volume to pass out of the cylinders before the beginning of the scavaging stroke.

By the valve operating and timing mechanism disclosed herein the varying conditions are all met in the most advantageous manner to increase both the power and flexibility of the engine and generally improve its efficiency.

Now reverting to the construction of the timing mechanism, the sleeve 62 is controlled in its circumferential adjustment by the operator by means of a link 67 (Figs. 2 and 6) which is pivotally connected to an arm 68 rigidly secured to sleeve 62. Adjustment of this sleeve controls the time of admission of oil to the cylinder 13 and therefore determines the time at which the admission valve 10 will open with respect to the piston position on the suction stroke. Sleeve 60 controls the discharge of oil from the cylinder 13 and therefore determines the time at which the admission valve will close; this sleeve may be automatically adjusted by piston 51 and rod 55', the movements of which vary with the speed of the engine. Sleeves 65 and 63 of exhaust valve control C are also circumferentially adjustable to control the entrance and discharge respectively of oil to and from the exhaust valve operating cylinder 14. These latter sleeves are automatically adjusted by piston 51 in response to the speed of the engine, and determine the times at which the exhaust valve 11 is opened and closed with respect to the crankshaft position. It should be here noted however, that sleeve 60 which controls the time of closing of the admission valve 10 need not necessarily be connected to the timing regulator G for the reason that in the operation of the engine a certain lag is created in the closing of the admission valve as the engine speeds up which tends to automatically take care of this adjustment irrespective of a direct control by the piston 51.

It will be noted that in each of Figures 9 to 15 inclusive four different sectional views are shown. The four sections of the time and phase changing device shown in Figure 9 give the relative positions of the pressure and discharge ports and passages for each of the extreme positions to which the sleeves may be set. The first section to the left shows the sleeves in position for the admission valves to open at the earliest period, and to close at the earliest period. This section also shows the sleeves of casing C in position for the exhaust valves to open at the earliest period and to close at the earliest period.

The second section of Figure 9 shows the sleeves of casing B in position for the admission valves to open at the latest period and close at the earliest period. This section also shows the sleeves of casing C in position for the exhaust valve to open at the earliest period and to close at the latest period.

The third section of Figure 9 shows the sleeves of casing B in position for the admission valves to open at the latest period and to close at the latest period. This section also shows the sleeves of casing C in position for the exhaust valve to open at the latest period and to close at the earliest period.

The fourth sectional view of Figure 9 shows the sleeves of casing B in position for the admission valves to open at the latest period and to close at the latest period. In this section the sleeves of casing C are in position for the exhaust valves to open at the latest period and to close at the latest period.

It is to be understood that these four sectional views shown in Figure 9 merely serve to illustrate the several extreme positions which the sleeves may assume under the present construction, and that even these extreme positions may be varied in constructions for engines having operating conditions different from those associated with the engine herein described.

The six rows of sections through the time and phase changing device following Figure 9; i. e., Figures 10 to 15 inclusive, show the relative positions of the ports and passages at the four extreme positions; the sections being taken respectively on lines 10—10 to 15—15 of Figure 1. In other words, the first section of Figure 10 is taken on line 10—10 of Figure 1 and the three remaining sections of this figure show the three other extreme positions which may be assumed at this point in the timing device. Likewise, the first section of Figure 11 shows one extreme position of the sleeves at line 11—11 of Figure 1 and the three remaining sections illustrate the three other extreme positions which the sleeves may assume at line 11—11. Figures 12, 13, 14 and 15 each shows a similar series of sections at lines 12—12, 13—13, 14—14 and 15—15.

Figures 16 and 17 are more or less diagrammatic views of the several sleeves and casings illustrating the relative positions of the ports or openings and passages in these elements. The first two views at the left of Figures 16 and 17 represent the inside of the outer casings B and C of the timing device, these casings being shown as longitudinally slitted and then flattened out. The remaining three views of Figure 16 represent outside views of sleeves 62, 61 and 60 of the admission valve timing mechanism, these sleeves also being represented as slitted and then flattened out. Correspondingly, the three views at the right of Figure 17 represent sleeves 65, 64 and 63 of the exhaust valve timing mechanism.

In these Figures 16 and 17 the lines 10—10 to 15—15 inclusive represent the points on these sleeves at which the sections through Figure 1 are taken, said sections being shown in Figures 10 to 15 inclusive.

Of the four adjustable sleeves 60, 62, 63 and 65, sleeves 63 and 65 are connected to the piston 51 for automatic adjustment in response to varying velocities of the fluid in the fluid system, while sleeve 62 is adjusted at will by the operator, this latter sleeve serving to control the time of opening of the admission valve 10. It is to be understood however, that any combination of these sleeves may be operatively connected to the piston 51 for automatic control.

I will now describe the construction and arrangement of the several ports or openings in the sleeves and casings and the course which the oil takes through these ports in its travel to and from the valve operating cylinders.

Port 101 of casing B for the admission valve timing device permits the passage of oil to the admission valve operating cylinder 13 for No. 1 cylinder, and ports 102, 103 and 104 perform the same functions for cylinders Nos. 2, 3 and 4; these ports may be termed operating ports. Port 105 of casing B allows oil to enter the casing before distribution to the several admission valve operating cylinders. Port 106 allows the escape of oil from casing B after it is discharged from the admission valve operating cylinders, and this port connects with pipes 30 and 31 leading to the suction side of the oil pump D.

Port 121 of casing C for the exhaust valve timing device permits the passage of oil to the exhaust valve operating cylinder 14 for No. 1 cylinder, and ports 122, 123, and 124 perform the same functions for cylinders Nos. 2, 3 and 4. Port 125 of casing C allows oil to enter the casing before distribution to the several exhaust valve operating cylinders. Port 126 allows the escape of oil from casing C after it is discharged from the exhaust valve operating cylinders, and this port connects with pipes 29 and 31 leading to the suction side of the oil pump D.

Sleeve 62 of the admission valve timing mechanism and which is under the direct control of the operator so as to determine the time of the opening of the admission valve with respect to the piston position on the suction stroke, is provided with four openings or ports 107 for the four cylinders. Communicating with these ports by means of channels 108 are the elongated openings or ports 109, also four in number. Diametrically opposed to openings 109 are four openings 112 of equal dimensions which are connected by channel 113 extending longitudinally along the outside of the sleeve 62. Channel 111 of sleeve 62 also extends longitudinally along the exterior thereof and distributes the oil to the several openings 110. Channel 111 is provided with an enlargement 111' for the purpose of maintaining communication with port 105 of casing B. Also communicating with channel 111 but contributing no part to the distribution of oil to the valve operating cylinders is an L-shaped channel 111''. This channel functions to equalize the thrust of the fluid on sleeve 62 thereby rendering the same easily adjustable.

Sleeve 65 of the exhaust valve timing mechanism is operated by the piston 51 to control the time of opening of the exhaust valves 11, and the openings 127, 131, 128 and 130 of this sleeve as well as the channels 129, 133 and 132 are substantially identical with those in sleeve 62 except that their positions are altered on the sleeve due to the fact that the sleeve 64 of the exhaust valve timing mechanism rotates in a reverse direction to sleeve 61 of the admission valve timing mechanism. It is therefore believed to be unnecessary to again describe these ports in detail. This sleeve also is provided with an L-shaped channel 133' which serves to equalize the thrust of the fluid pressure on the sleeve to facilitate its circumferential adjustment.

Sleeves 61 and 64 of the fluid distributing mechanisms are identical except that the positions of the openings are slightly different due to the fact that they rotate in opposite directions. As hereinbefore stated these sleeves rotate at one-fourth crank-shaft speed through gearing 66 and 66' and rotate continuously so long as the engine is in operation. Sleeve 61 contains sixteen openings arranged in eight sets of two each and numbered 114 and 115, two sets being associated with each valve operating cylinder. Openings 114 are diametrically opposed and openings 115 are also diametrically opposed. Oil traveling to the admission valve operating cylinder will pass through openings 114 and on its return will pass through openings 115 on its way to pipe 30. The lower set of openings 114 and 115 function with respect to cylinder No. 1 and the six other sets distribute to cylinders Nos. 2, 3 and 4. The eight sets of openings 134 and 135 in sleeve 64 operate in the same manner as the openings in sleeve 61 and it is therefore not thought necessary to describe these ports in detail.

The sleeves 60 and 63 of the two timing mechanisms are the innermost sleeves appearing in the several sectional views and control the discharge of the operating fluid from the valve operating cylinders. These sleeves are provided with four sets of openings 118, 119, 138 and 139. The openings 118 and 119 and the openings 138 and 139 are arranged in pairs, two for each cylinder. These openings pass entirely through the sleeves and it is only because the sleeves are represented as slit through one end of these openings 118 and 138 that there appears to be three openings 118 and 138 for each cylinder. These sleeves are circumferentially adjustable for the purpose of altering the time of closing of the valves, the sleeve 63 as hereinbefore mentioned, being automatically adjusted through its connection with the piston 51. The oil passes through openings 118 on its travel to the admission valve operating cylinders and through 119 on its return therefrom. The openings 138 and 139 of sleeve 63 serve the same purpose and need not be described in detail.

I will now trace the complete course of the oil after leaving pipe 26 to its return to the suction side of the oil pump D, in a single operation of both the admission and exhaust valves for one cylinder. The operation of the valves for the other engine cylinders is of course identical and the description for one cylinder will suffice for all.

The oil leaving pipe 26 will first enter passage 26' formed in the base of the timing device, thence through opening 105 into the distributing channel 111 of sleeve 62 then through lower opening 110 from whence it will pass through one of the openings 114 in sleeve 61; into the opening 118 in sleeve 60, thence at the proper time through the second opening 114. When the second opening 114 registers with port 107 the oil will be allowed to pass through into channel 108 in sleeve 62, channel 108 being in communication at all times with opening 101 in casing B. The oil is then lead by pipe 140 to the admission valve operating cylinder 13.

The pressure is retained in the valve operating cylinder while the sleeve 61 rotates through the number of degrees which it is desired to maintain the admission valve open, that is, until opening 115 in sleeve 61 registers with the opening 119 in sleeve 60, at which time the pressure is released by the oil being allowed to pass from the valve operating cylinder through opening 101 in casing B, channel 108 and opening 109 in sleeve 62, thence through said opening 115 in sleeve 61, opening 119 in sleeve 60, second opening 115 in sleeve 61, opening 112 and channel 113 in sleeve 62, and opening 106 in casing B, into return pipe 30.

In the operation of the exhaust valve 11 the oil under pressure also passes through pipe 26 to opening 26', then through opening 125 in casing C, into the distributing channel 133 in sleeve 65, thence through opening 127 in said sleeve, and as the motor rotates an amount sufficient to cause one of the openings 134 in sleeve 64 to register with opening 127 in sleeve 65 the oil will pass through said opening 134 into opening 138 in sleeve 63, then at the proper time for the exhaust valve to open the second opening 134 will register with opening 128 in sleeve 65 at which time the oil will pass through opening 128 in channel 129 and opening 121 in casing C into pipe 141 and thence to valve-operating cylinder 14.

The pressure is retained in the valve-operating cylinder while the sleeve 64 rotates through the number of degrees which it is desired to maintain the exhaust valve open, that is, until one of the openings 135 in sleeve 64 registers with the opening 139 in sleeve 63, at which time the pressure is released by the oil being allowed to pass through opening 121 in casing C, opening 130 in sleeve 65, the said opening 135 in sleeve 64, opening 139 in sleeve 63, second opening 135 in sleeve 64, opening 131 and channel 132 in sleeve 65, into opening 126 in casing C and thence into pipe 29 returning to the suction side of pump D.

In order to more clearly describe the operation of this distributing or timing mechanism A it may be well to here set forth its essential features without referring to the details as just described.

The opening 105 in the casing B is in communication at all times with the distributing channel 111 in sleeve 62 for which purpose the enlargement 111' is provided; likewise the opening 125 in casing C is in communication at all times with the distributing channel 133 in sleeve 65; also opening 106 in casing B is in communication at all times with openings 112 in sleeve 62 by means of the channel 113; likewise opening 126 in casing C is in communication at all times with openings 131 in sleeve 65 by means of channel 132; it is also true that openings 101, 102, 103 and 104 in casing B are at all times in communication with their respective openings 107 and channels 108 in sleeve 62; furthermore the openings 121, 122, 123 and 124 of casing C have the same relation with the openings 128 and channels 129 of sleeve 65. Sleeves 61 and 64 are rotated at one-fourth crankshaft speed by means of gearing 66 and 66', sleeve 61 rotating in a clockwise direction in the sections shown, and sleeve 64 rotating in an anti-clockwise direction. The openings in sleeve 61 and 64 always maintain the same relationship; and the openings 115 and 114 in sleeve 61 and the openings 134 and 135 in sleeve 64 being diametrically opposed the same sequence of events occurs at each half revolution of the sleeves 61 and 64.

The first section in Figure 10 shows sleeve 62 in position for the earliest opening of the admission valves, and sleeve 60 in position for the earliest closing of the admission valves. Sleeve 65 is in position for the earliest opening of the exhaust valves, and sleeve 63 in position for the earliest closing of the exhaust valves. In this view the sleeve 61 is shown in position at which any rotation of the engine forward will allow the passage of oil into the admission valve operating cylinder for No. 1 cylinder, but the sleeve 62 may be rotated in a clockwise direction from the position shown to the position shown in the second sectional view of Figure 10, thus rendering it necessary for sleeve 61 to rotate a greater amount before the opening 114 registers with opening 107 to allow the passage of oil into the admission valve operating cylinder.

In like manner the sleeve 65 may be rotated in an anti-clockwise direction to the position shown in the third section of Fig. 10, thereby requiring that sleeve 64 rotate a farther amount equal to the movement of sleeve 65 before opening 134 registers with the opening 128 to allow the passage of oil into exhaust valve operating cylinder.

The first sectional view of Figure 12 shows the position of the openings for the release of pressure from the valve operating cylinders. When sleeve 61 rotates an amount sufficient to allow opening 115 to register with opening 119 in sleeve 60 the pressure is released from the admission valve operating cylinder; but sleeve 60 may be rotated in a clockwise direction to the position shown in the third sectional view of Figure 12 which will require that sleeve 61 rotate an additional amount before opening 115 of sleeve 61 registers with opening 119 of sleeve 60, thereby preventing the closing of the admission valve until a later period.

In like manner when the opening 135 in sleeve 64 registers with opening 139 in sleeve 63 the pressure will be released from the exhaust valve operating cylinder; but the sleeve 63 may be rotated in an anti-clockwise direction to the position shown in the second sectional view of Figure 12, thereby making it necessary that sleeve 64 rotate an additional amount before opening 135 of sleeve 64 registers with opening 139 of sleeve 63, which prevents the exhaust valve from closing until a later period.

It is to be particularly noted that the several positions of the adjustable sleeves 60, 62, 63 and 65 shown in Figures 9 to 15 inclusive are merely illustrative of the operation of these sleeves, and that they are all capable of assuming varying positions. The sleeve 62 is manually adjustable as desired while the sleeves 63 and 65 are mechanically and automatically adjusted in response to the speed of the engine; sleeve 60 controlling the closing of the admission valve may also be mechanically and automatically adjusted in response to the engine speed if desired.

It will thus be apparent that the opening and closing of each of the valves will be timed to give maximum power not only at low speeds but also at whatever speed the engine may operate. For instance, we may first consider the operation of the timing mechanism starting from low power at slow speed, and first increasing the power to a maximum at slow speed, and then allowing the speed to increase to a maximum. Sleeves 62 and 65 will be in retarded positions thereby causing a late opening of the admission valves, and the exhaust valves to be opened at completion of the expansion stroke. Sleeves 60 and 63 will be in position to cause the admission valves to close at bottom center (completion of suction stroke) and the exhaust valves to close at top center (completion of scavenging stroke). The sleeve 62 may now be advanced allowing more and more explosive mixture to enter the cylinders due to an earlier opening of the admission valve, and at the same time the amount of air entering the cylinder through an auxiliary valve to be later described, is reduced owing to the reduction of time from the beginning of the suction stroke to the point of opening of the admission valve. The time of closing of the admission valve and the opening and closing of the exhaust valve will continue as above stated so long as the speed of the engine does not increase. As the motor speed increases the volume of fluid (oil or the like) through the pressure system per unit of time increases due to the increased number of valve operations and the increased speed of the pump D which is geared to the crankshaft. The increased volume operating against piston 51 raises the latter an amount dependent upon the shape of the pin 53 and the compression on the spring 54. It is this upward movement of piston 51 as the speed of the engine increases which causes the timing sleeve 65 to be rotated in a direction to cause the exhaust valves to be opened earlier in relation to the crankshaft position and the sleeve 63 to be rotated in a direction to cause the valves to close at the proper time relative to the crankshaft position. This movement of the piston 51 may also rotate sleeve 60 to alter the closing of the admission valve; i. e., should it be found desirable to make this connection to the piston 51. In the preferred form of the invention such a connection is unnecessary; however, under certain circumstances, such as where the weight of the valves and the compression of the springs for closing the valves do not conform with the desired variations in closing, such a connection would be advisable.

While in the preceding description relating to the time and phase changing mechanism the operation thereof relates specifically to internal combustion engines, it is quite apparent that this mechanism is of equal utility in any type of mechanism having movable parts, the time and phase of which require regulation.

As hereinbefore stated the automatic adjustment of the sleeves is accomplished by means of certain connections with the rod 55 which will now be described.

A vertically disposed guideway 160 is mounted on the engine above cylinder 50, and slidably mounted thereon is the block 161 as more clearly shown in Figure 2ª. This block is attached to the upper end of rod 55 and is provided with a transversely extending pin 162 which operates in cam slots 163 and 164 in levers 165 and 166 respectively. These levers 165 and 166 are pivoted at their upper ends to the upper end of the guideway 160 and pivotally connected to these levers intermediate the ends of the latter are the two operating links 167 and 168. Links 167 and 168 are pivotally connected to arms rigidly connected with sleeves 63 and 65, one of these arms being designated by numeral 169 (Figure 6). As the rod 55 is raised or lowered through operation of the piston 51 the pin 162 traveling in the cam slots 163 and 164 will cause the levers 165 and 166 to rock about their pivot points and thus impart movement to the links 167 and 168. This movement of the links 167 and 168 is of course transmitted to the sleeves 63 and 65 of the time and phase changing mechanism as hereinbefore described.

In Figure 19 is shown an enlarged view of one of the valve operating cylinders 18. This cylinder is provided with a piston 15 and piston rod 170 which operates the admission valve 10 and also with means for causing a more gradual stopping of the valve movement at each end of its travel. The gradual stopping of the valve at the completion of the opening movement is accomplished by a ring shaped valve 171 attached to the head of piston rod 170 by means of four pins 172 which are slidably mounted in the head. The ring is provided with a plurality of apertures 174 and is adapted to enter a groove 173 in the abutment 175, and also to seat against the head of the piston rod 170 in such manner as to close the apertures 174. The result of this arrangement of parts is as follows: As the piston 15 moves upwardly (Figure 19) the perforated ring 171 is pressed against the head of piston rod 170 thereby closing the apertures 174 so that upon its entrance into the groove 173 a certain amount of air will be trapped within the groove thus providing a cushioning effect for the piston. As the piston is caused to move downwardly (Figure 19) the apertures in ring 171 are uncovered thereby allowing the entrance of air into the groove 173 and avoiding any resistance to its movement which might otherwise be caused by a vacuum.

Attached to the head of piston 15 is a pin 176 on which is slidably mounted a disc valve 177 which is normally projected away from the piston head by means of spring 178. The disc 177 is provided with a passage 179 the function of which will presently appear. The pin 176 is of such length that when valve 10 is seated the disc 177 will be seated against a shoulder at the end of cylinder 13 and the head 180 of the pin will have moved a slight distance away from the disc 177. The action of these parts is as follows: Upon the pressure being released from cylinder 13 the piston 15 is moved downwardly (Figure 19) due to the action of spring 12 thus causing the oil to flow out of cylinder 13. This flow of oil is unobstructed until such time as disc 177 seats against the shoulder in the end of cylinder 13, at which time the flow is reduced to the amount which can pass through the hole 179, thereby retarding the movement of the piston until such time as valve 10 reaches its seat.

In Figure 21 is shown an enlarged view of a slightly modified form of valve-operating cylinder in which no provision is made for the retarding actions just described.

The cylinder housing 17 is mounted on a plate 190, a plan view of which is shown in Figure 3. This plate is provided with openings 191 for the passage of piston rods 170 from the valve-operating cylinders, and is also provided with a channel 192 communicating with the inner ends of the valve-operating cylinders the purpose being to prevent any resistance being offered to the movements of the pistons by preventing the accumulation of pressure or the production of a vacuum in these spaces; and also to allow for the passage into pipe 193 of any fluid which may escape past the pistons 15 and 16. The end view, Figure 3ª shows the depth of channel 192 and also the method of making connection with pipe 193. This pipe 193 is connected into tank E and returns thereto such fluid as may escape past the pistons 15 and 16.

Having fully described the operation of the timing or fluid distributing device and the parts immediately associated therewith, I will now describe the auxiliary valve which functions to maintain the compression pressure constant in the cylinders.

Referring to Figures 4, 5 and 7 it will be seen that the engine head is provided with narrow, vertically extending pockets 80, in the top of which are mounted the spark plugs 81. In one wall of each of these pockets are formed the valve seats for the admission and exhaust valves 10 and 11, while in the opposite wall is a valve seat cooperating with the spring-pressed auxiliary valve 82. As will be seen from an inspection of Figures 5 and 7 the valve 82 is in a direct alignment with admission valve 10, and that when admission valve 10 is fully open the valve 82 must necessarily be closed. It is also true that if valve 82 is open at the time the operator sets the mechanism for opening valve 10 then this valve will directly engage and close the auxiliary valve 82. Four of these valves are provided in the present instance, one for each admission valve, and they control the admission of air through a manifold 83 to the interior of the cylinders. These valves are opened by suction created by the pistons, and while intended to admit atmospheric air it will be readily understood that a carburetor 84 may be attached to the manifold 83 as indicated in Figures 7 and 8 so that a heavy or low grade of fuel may be employed, if desirable.

This part of the mechanism functions as follows: If maximum power is desired at low speed the admission valve is opened at the beginning of the suction stroke of the piston and consequently the cylinder is filled with explosive mixture, the auxiliary valve remaining closed. Should less than maximum power be required however the admission valve will not be opened at the beginning of the suction stroke of the piston. On the contrary, this valve will remain closed temporarily but the valve 82 will open as soon as the vacuum created is sufficient to overcome the pressure of its spring. Atmospheric air (or low grade fuel) will now enter into the cylinder until the admission valve 10 is opened. As soon as this valve is opened the valve 82 will be closed by direct contact of the admission valve against the valve 82. The explosive mixture will now enter the cylinder on top of the earlier charge of air (or low grade fuel) until such time as the admission valve is closed. The upstroke of the piston will now compress the two layers of fluid and the compression pressure will be substantially the same as if the engine was operating with a maximum fuel charge.

It should here be emphasized that inasmuch as the admission valves alone control the quantity of fuel charges to the cylinder, the usual throttle valve found in the usual type of internal combustion engine is here eliminated. This elimination of the throttle valve is of paramount importance in that it permits of the introduction of more uniform mixtures of fuel to the cylinders for all speeds of the engine. This advantageous result may be briefly described as follows: In engines controlled by a throttle valve in the intake manifold the velocity of the gases changes with each change in quantity entering the cylinders during the suction stroke, due to the fact that the same relative time is consumed in taking in a small quantity as would be consumed in taking in the full capacity of the cylinder, and since the suction on the fuel is dependent upon the velocity of the air passing the fuel supply, the proportion of fuel to air varies for each throttle position. In the present construction this defect is overcome by the entire omission of the throttle valve which retards the passage of gases through the intake manifold, thereby permitting a free flow of the gases for a limited time rather than a restricted flow over the full time. The result of varying the length of time the gases travel but maintaining the velocity constant, is the equivalent so far as the total quantity of charge is concerned, as varying the velocity but maintaining the time of travel of the gases constant. However, by the former process the suction values on the fuel are maintained constant and a uniform mixture secured, whereas by the latter process the mixture varies for every throttle position.

The operation of the engine and many of its advantages have been fully set forth in connection with the description of the various parts thereof and it is not believed desirable to repeat the same here. Nevertheless, there are numerous additional beneficial results attained in the present construction and a brief statement of a few of them is believed fitting.

First. The maintenance of a full charge of gases in the cylinder, either air and explosive mixture, inferior fuel and explosive mixture, or explosive mixture alone, aids in the prevention of lubricating oil passing the pistons due to excessive vacuums in the cylinders.

Second. The operation of the valves by fluid pressure, eliminates the necessity of mechanically adjusting the valves from time to time, and also eliminates the noises attendant to cam-operated valves.

Third. The present construction permits the use of a sufficient quantity of oil to lubricate the cylinders without causing the oil to be drawn past the pistons to foul the spark plugs, cause carbon deposits, etc.

Fourth. The discharge of carbon monoxide gas from the engine is practically eliminated due to better combustion of the cylinder charges.

Fifth. A higher thermal efficiency is provided due to the fact that the heat from the gases at slow speeds is to a great extent utilized in expanding the air in the cylinders.

Sixth. Greater flexibility of the engine results from the timing of the valves to suit varying operating conditions.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. In an internal combustion engine including admission and exhaust valves, pressure-operated means for governing independently the time of operation of said valves.

2. In an internal combustion engine including admission and exhaust valves, means for varying the time of opening of the admission valve, and pressure-operated means for independently governing the time of opening of the exhaust valve.

3. In an internal combustion engine including admission and exhaust valves, means controlled by the speed of the engine for varying the time at which the admission valve is closed and means for independently controlling the opening of the admission valve, said means being adjustable from zero to a maximum.

4. In an internal combustion engine including admission and exhaust valves, fluid means responsive to the speed of the engine for governing the time of operation of the exhaust valve.

5. In an internal combustion engine including admission and exhaust valves, fluid means responsive to the speed of the engine for governing the time of closing of one of said valves independently of the time of opening.

6. In an internal combustion engine including admission and exhaust valves, fluid means responsive to the speed of the engine for governing both the time of closing of the admission valve and the time of opening and closing of the exhaust valve.

7. In an internal combustion engine including admission and exhaust valves, flexible means for regulating independently the time of operation of said valves.

8. In an internal combustion engine including admission and exhaust valves; fluid means responsive to the speed of the engine for governing independently the time of closing of the admission valve and the time of opening of the exhaust valve.

9. In an internal combustion engine including admission and exhaust valves, fluid means responsive to the speed of the engine for governing the time of opening of one of said valves independently of its time of closing.

10. In an internal combustion engine including admission and exhaust valves, fluid means responsive to the speed of the engine for governing independently the time of opening and the time of closing of the exhaust valve.

11. An internal combustion engine including a cylinder and admission and exhaust valves, fluid-operated means for operating said valves, means for distributing fluid to said fluid-operated means, and means responsive to the speed of the engine for regulating the pressure of said fluid.

12. An internal combustion engine including a cylinder and admission and exhaust valves, fluid-operated means for operating said valves, means responsive to the speed of the engine for distributing fluid to said fluid-operated means, and means for varying the pressure of said fluid.

13. An internal combustion engine including a cylinder and admission and exhaust valves, fluid-operated means for operating said valves, means responsive to the speed of the engine for distributing fluid to said fluid-operated means, and means also responsive to the speed of the engine for regulating the pressure of said fluid.

14. In an internal combustion engine including intake and exhaust valves, a cylinder and piston for operating each of said valves, and a fluid controlling valve associated with each side of said piston for retarding the movement of said first-mentioned valve at each end of its stroke.

15. A time and phase changing mechanism including a plurality of cooperating, relatively movable elements, said elements being provided with passages for the flow of a fluid transversely of said elements in alternate directions.

16. A time and phase changing mechanism including a plurality of cooperating, relatively movable sleeves, said sleeves being provided with passages for the flow of a fluid in alternate directions.

17. A time and phase changing mechanism including a plurality of concentrically arranged, relatively movable sleeves, said sleeves being provided with a plurality of openings and channels for the flow of a fluid in alternate directions.

18. A time and phase changing mechanism including a plurality of concentrically arranged, relatively movable sleeves, said sleeves being provided with a plurality of openings and channels for the flow of fluid in alternate directions, and means for adjusting said sleeves relatively.

19. A time and phase changing mechanism including a plurality of cooperating relatively movable elements, said elements being provided with passages for the flow of a fluid, and means for automatically varying the positions of said elements.

20. An internal combustion engine including a cylinder and admission and exhaust valves, fluid-operated means for operating said valves, and means for distributing fluid to said fluid-operated means, said means including a plurality of concentrically arranged adjustable sleeves.

21. An internal combustion engine including a cylinder and admission and exhaust valves, fluid-operated means for operating said valves, and means for distributing fluid to said fluid-operated means, said means including a plurality of concentrically arranged adjustable sleeves, one of said sleeves being rotatably mounted.

22. An internal combustion engine including a cylinder and admission and exhaust valves, fluid-operated means for operating said valves, means for distributing fluid to said fluid-operated means, said means including a plurality of concentrically arranged sleeves, one of said sleeves being rotatably mounted, and means for adjusting certain of the other sleeves with respect thereto.

23. An internal combustion engine including a cylinder and admission and exhaust valves, fluid-operated means for operating said valves, means for distributing fluid to said admission valve operating means, said means including a rotatably mounted sleeve geared to the engine and two other sleeves cooperating therewith and adjustable with respect thereto, means for manually controlling one of said adjustable sleeves, and means responsive to the speed of the engine for controlling said other adjustable sleeve.

24. An internal combustion engine including a cylinder and admission and exhaust valves, fluid-operated means for operating said valves, means for distributing fluid to said exhaust valve operating means, said means including a rotatably mounted sleeve geared to the engine and two other sleeves cooperating therewith and adjustable with respect thereto, and means responsive to the speed of the engine for controlling said adjustable sleeves.

25. An internal combustion engine including a cylinder and admission and exhaust valves, fluid-operated means for operating said valves, means for distributing fluid to said fluid-operated means, said means including a plurality of concentrically arranged adjustable sleeves, one of said sleeves being mounted for rotation, and means geared to the engine crankshaft for rotating said sleeve.

26. An internal combustion engine including a cylinder and admission and exhaust valves, fluid-operated means for operating said valves, means for distributing fluid to said fluid-operated means, said means including a plurality of concentrically arranged sleeves, one of said sleeves being mounted for rotation, means geared to the engine crankshaft for rotating said sleeve, and means for circumferentially adjusting certain of said other sleeves.

27. An internal combustion engine including a cylinder and admission and exhaust valves, fluid operated means for operating said valves, means for distributing fluid to said fluid-operated means, said means including two sets of concentrically arranged sleeves, one sleeve of each set being rotatably mounted, means geared to the engine for rotating said rotatably mounted sleeves, certain of the other sleeves of each set being mounted for circumferential adjustment, and means responsive to the speed of the engine for adjusting certain of said circumferentially adjustable sleeves.

28. An internal combustion engine including a cylinder and admission and exhaust valves, fluid-operated means for operating said valves, means for distributing fluid to said fluid-operated means, said means including two sets of concentrically arranged sleeves one set for the admission valve and the other set for the exhaust valve, one sleeve of each set being rotatably mounted, means geared to the engine for rotating said sleeves, one of the sleeves of the set for controlling the admission valve being mounted for circumferential adjustment and two of the sleeves of the set for controlling the exhaust valve being mounted for circumferential adjustment, and means responsive to the speed of the engine for adjusting said circumferentially adjustable sleeves.

29. An internal combustion engine including a cylinder and admission and exhaust valves, fluid-operated means for operating said valves, means for distributing fluid to said fluid-operated means, said means including a plurality of concentrically arranged sleeves, one of said sleeves being rotatably mounted, means geared to the engine for rotating said sleeve, certain of the other of said sleeves being mounted for circumferenial adjustment, a metering device having movement responsive to the speed of the engine, and mechanisms connecting one end of said metering device with said circumferentially adjustable sleeve.

30. An internal combustion engine including a cylinder and admission and exhaust valves, fluid-operated means for operating said valves, means for distributing fluid to said fluid-operated means, said means including two sets of concentrically arranged sleeves, one sleeve of each set being rotatably mounted, means geared to the engine for rotating said sleeves, certain of the other sleeves being mounted for circumferential adjustment, a metering device having movement responsive to the speed of the engine, and links connecting said metering device with said circumferentially adjustable sleeves.

31. In an internal combustion engine including a cylinder and fluid-operated admission and exhaust valves, a timing device for said valves, and means for regulating said timing device including a pressure regulator.

32. In an internal combustion engine including a cylinder and fluid-operated admission and exhaust valves, a timing device for said valves, and means for regulating said timing device including a pump and a metering device.

33. In an internal combustion engine including a cylinder and fluid-operated admission and exhaust valves, a timing device for said valves, and means for regulating said timing device including a pump, a pressure regulator, and a metering device associated with said pump and pressure regulator and connected to said timing device.

34. In an internal combustion engine including a cylinder and fluid-operated admission and exhaust valves, a timing device, a fluid pressure system associated therewith, and a metering device controlled by the pressure of fluid in said system and connected to said timing device.

35. In an internal combustion engine including a cylinder and fluid-operated admission and exhaust valves, a timing device, a fluid pressure system associated therewith, a pump and a pressure regulator in said system, and a metering device also in said system and controlled by the pressure of fluid therein, and means connecting said metering device and timing device.

36. In an internal combustion engine provided with fluid-operated valves, a fluid pressure system, a timing device associated therewith for controlling said valves, a metering device connected to said timing device, said metering device including a piston having an aperture for the passage of fluid, said piston being exposed to the fluid pressure, and an air chamber in said system.

37. In an internal combustion engine provided with fluid-operated valves, a fluid pressure system, a timing device associated therewith for controlling said valves, a metering device connected to said timing device and including an apertured piston and a tapered pin extending through said aperture, said piston being exposed to the fluid pressure in said system.

38. In an internal combustion engine provided with fluid-operated valves, a fluid pressure system, a pressure regulator therein, a valve in said regulator, a piston for operating said valve, the opposed faces of said piston being of different areas, and means for exposing the opposed faces of said piston to the pressure on two sides of said system.

39. In an internal combustion engine provided with fluid-operated valves, a timing device for said valves, a fluid pressure system, a pressure regulator therein, a spring-pressed valve in said regulator, a piston for operating said valve, a metering device connected to said timing device and exposed to the pressure in said system, the lower portion of said metering device being constructed and arranged to build up differential pressures in said system, and means for exposing the two faces of said piston to the differential pressures.

40. A timing or distributing device for fluid-operated valves, said device including a plurality of concentrically arranged, relatively movable sleeves, said sleeves being provided with openings and channels formed at predetermined positions thereon, for the passage of the fluid in alternate directions.

41. A timing or distributing device for fluid-operated valves of an internal combustion engine, said device including two sets of concentrically arranged, relatively movable sleeves, an intermediate sleeve of each set being geared to the engine crankshaft to rotate at one-fourth crankshaft speed, each of said last-named sleeves being provided with diametrically opposed openings, the remainder of said sleeves being provided with openings formed at predetermined positions thereon for the passage of fluid.

42. A timing or distributing device for fluid-operated valves, said device including a plurality of relatively movable sleeves one of which is manually operated, said sleeves provided with openings at predetermined points for the passage of fluid, said manually operated sleeve provided with channels for the reception of fluid, said channels being so disposed as to counterbalance the thrust caused by the pressure of fluid on the walls of the openings in said sleeves.

43. In an internal combustion engine, means for controlling independently the beginning and stopping of the admission of gases, and means for adjusting said controlling means from zero to a maximum.

44. In an internal combustion engine, means for controlling independently the beginning and stopping of the exhaust of gases, and means for adjusting said controlling means from zero to a maximum.

45. In an internal combustion engine including a cylinder and fluid operated admission and exhaust valves, a timing device, a fluid pressure system associated therewith, and a metering device controlled by the flow of fluid in said system and connected to said timing device.

46. In an internal combustion engine including admission and exhaust valves, means for regulating the time of operation of one of said valves independently of the means for operating said valves.

47. In an internal combustion engine including admission and exhaust valves, means for operating said valves, and means for independently timing one or more of the operations of said operating means.

48. In an internal combustion engine including admission and exhaust valves, a combustion chamber, and means for varying independently the time of opening and closing of one of said valves.

49. An internal combustion engine including admission and exhaust valves, and means adjustable for maintaining one of said valves open during any desired portion of its normally operative period.

50. A time and phase changing mechanism including a casing provided with an operating port, an inlet port and an exhaust port, a fluid pressure supply communicating with said inlet port, a rotatably mounted sleeve within said casing and provided with openings for permitting communication between said operating port and inlet and exhaust ports, and adjustable means for varying the time of communication between said ports.

51. A time and phase changing mechanism including a casing provided with an operating port, an inlet port and an exhaust port, a fluid pressure supply communicating with said inlet port, a rotatably mounted sleeve within said casing and provided with openings for permitting communication between said operating port and inlet and exhaust ports, and circumferentially adjustable means for varying the time of communication between said ports.

52. A time and phase changing mechanism including a casing provided with an operating port, an inlet port and an exhaust port, a fluid pressure supply communicating with said inlet port, a rotatably mounted sleeve within said casing and provided with openings for permitting communication between said operating port and inlet and exhaust ports, and an adjustable sleeve for varying the time of communication between said ports.

53. A time and phase changing mechanism including a casing provided with an operating port, an inlet port and an exhaust port, a fluid pressure supply communicating with said inlet port, a rotatably mounted sleeve within said casing and provided with openings for permitting communication between said operating port and inlet and exhaust ports, and adjustable sleeves within said casing for varying the time of communication between said ports.

54. A time and phase changing mechanism including a casing provided with an operating port, an inlet port and an exhaust port, a fluid pressure supply communicating with said inlet port, a rotatably mounted sleeve within said casing and provided with openings for permitting communication between said operating port and inlet and exhaust ports, and adjustable sleeves on the interior and exterior of said rotatably mounted sleeve for varying the time of communication between said ports.

JOSEPH REX DAVIS.